(12) United States Patent
Hoshino et al.

(10) Patent No.: US 11,066,517 B2
(45) Date of Patent: Jul. 20, 2021

(54) PROCESSES FOR PRODUCING FLUORINATED ETHER COMPOUNDS

(71) Applicant: AGC Inc., Chiyoda-ku (JP)

(72) Inventors: Taiki Hoshino, Chiyoda-ku (JP);
Motoshi Aoyama, Chiyoda-ku (JP);
Kiyotaka Takao, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/282,406

(22) Filed: Feb. 22, 2019

(65) Prior Publication Data

US 2019/0218339 A1 Jul. 18, 2019

Related U.S. Application Data

(63) Continuation of application No. PCT/JP2017/029686, filed on Aug. 18, 2017.

(30) Foreign Application Priority Data

Aug. 30, 2016 (JP) .............................. JP2016-167697

(51) Int. Cl.
| | |
|---|---|
| *C08G 65/336* | (2006.01) |
| *C08G 65/337* | (2006.01) |
| *C08G 65/333* | (2006.01) |
| *C08G 65/00* | (2006.01) |
| *C09D 5/00* | (2006.01) |
| *C09D 171/02* | (2006.01) |

(52) U.S. Cl.
CPC ......... *C08G 65/336* (2013.01); *C08G 65/007* (2013.01); *C08G 65/337* (2013.01); *C08G 65/33306* (2013.01); *C09D 5/00* (2013.01); *C09D 171/02* (2013.01); *C08G 2650/48* (2013.01)

(58) Field of Classification Search
CPC ............ C08G 65/007; C08G 65/33303; C08G 65/33306
See application file for complete search history.

(56) References Cited

U.S. PATENT DOCUMENTS

| | | | |
|---|---|---|---|
| 3,646,085 A | 2/1972 | Bartlett et al. | |
| 3,810,874 A * | 5/1974 | Mitsch et al. | C08G 18/5003 528/70 |
| 4,094,911 A | 6/1978 | Mitsch et al. | |
| 4,481,364 A * | 11/1984 | Chu | C07F 7/1876 556/413 |
| 5,789,534 A | 8/1998 | Koike et al. | |
| 6,200,684 B1 | 3/2001 | Yamaguchi et al. | |
| 2014/0302332 A1 | 10/2014 | Murotani et al. | |
| 2015/0274888 A1 | 10/2015 | Sakoh | |

FOREIGN PATENT DOCUMENTS

| | | | |
|---|---|---|---|
| JP | 58-167597 A | * | 10/1983 |
| JP | 60-34924 | | 2/1985 |
| JP | 61-12751 | | 1/1986 |
| JP | 62-178592 | | 8/1987 |
| JP | 9-48846 | | 2/1997 |
| JP | 11-029585 A | * | 2/1999 |
| JP | 2000-327772 | | 11/2000 |
| JP | 2004-323408 | | 11/2004 |
| JP | 2015-196723 | | 11/2015 |
| WO | WO 2013/121984 A1 | | 8/2013 |
| WO | WO 2014/209635 A1 | | 12/2014 |
| WO | 2016/092900 | | 6/2016 |

OTHER PUBLICATIONS

Machine translation of JP 58-167597 (no date).*
International Search Report dated Oct. 17, 2017 in PCT/JP2017/029686 filed Aug. 18, 2017 (with English Translation).

* cited by examiner

*Primary Examiner* — Marc S Zimmer
(74) *Attorney, Agent, or Firm* — Oblon, McClelland, Maier & Neustadt, L.L.P.

(57) ABSTRACT

Processes for producing a fluorinated ether compound are provided by which fluorinated ether compound capable of imparting excellent water/oil repellency, to a substrate surface or a hard coat layer can be easily produced in high yield. A process comprising reacting $R^f(CF_2)_a$—$CF_2OC(=O)R^{f4}$ or $R^f(CF_2)_a$—$C(=O)X^1$ with $HN(-R^1CH=CH_2)_2$ to obtain $R^f(CF_2)_a$—$C(=O)N(-R^1CH=CH_2)_2$ and a process comprising obtaining the above product and reacting the product with $HSiR^2{}_nL_{3-n}$ to obtain $R^f(CF_2)_a$—$C(=O)N(-R^1CH_2CH_2SiR^2{}_nL_{3-n})_2$ wherein $R^f$ is a linear polyfluoroalkyl group having at least two carbon atoms and at least one etheric oxygen atom between carbon atoms, $R^{f4}$ is a $C_{1-30}$ perfluoroalkyl group or the like, $X^1$ is a halogen atom, $R^1$ is an alkylene group, a is an integer of from 1 to 5, $R^2$ is a monovalent hydrocarbon group, L is a hydrolyzable group, and n is an integer of from 0 to 2.

13 Claims, No Drawings

PROCESSES FOR PRODUCING FLUORINATED ETHER COMPOUNDS

TECHNICAL FIELD

The present invention relates to processes for producing fluorinated ether compounds.

BACKGROUND ART

Fluorinated compounds show high lubricity, water/oil repellency, etc. and are thus useful for surface treating agents. Such surface treating agents impart water/oil repellency to a substrate surface, thereby making it easy to wipe off stains from the substrate surface with improved stain removability. Among such fluorinated compounds, a fluorinated ether compound having a poly(oxyperfluoroalkylene) chain, wherein an ether bond (—O—) is present in the perfluoroalkylene chain, can particularly impart excellent fat and oil stain removability.

As surface treating agents containing such a fluorinated ether compound, for example, an anti-fingerprint agent which imparts fingerprint stain removability to a substrate surface and a water/oil repellent hard-coat-layer additive to be added to a hard-coat-layer-forming composition to impart fingerprint stain removability, oil-based ink repellency and the like to the resulting hard coat layer may be mentioned. Such anti-fingerprint agents may be those containing a fluorinated ether compound having a hydrolyzable silyl group. Such water/oil repellent hard-coat-layer additives may be those containing a fluorinated ether compound having a polymerizable carbon-carbon double bond.

As a fluorinated ether compound having a hydrolyzable silyl group, for example, compound (11) is known (Patent Document 1).

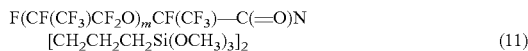

wherein m is an integer of from 6 to 50.

PRIOR ART DOCUMENTS

Patent Documents

Patent Document 1: JP-A-2000-327772

DISCLOSURE OF INVENTION

Technical Problem

Patent Document 1 states that compound (11) is obtained by reacting compound (12) with trimethoxysilane.

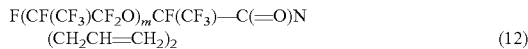

However, Patent Document 1 does not describe how to obtain compound (12), much less its yield.

The substrate surface treated with an anti-fingerprint agent containing compound (11) and a hard coat layer containing a water/oil repellent containing compound (12) are insufficient in abrasion resistance and lubricity.

The object of the present invention is to provide processes for producing fluorinated ether compounds which can impart excellent water/oil repellency, abrasion resistance and fingerprint stain removability to a substrate surface and a hard coat layer easily in a high yield.

Solution to Problem

The present invention provides processes for producing fluorinated ether compounds having the following constructions [1] to [12].

[1] A process for producing a fluorinated ether compound, which comprises reacting a compound represented by the following formula (3) or a compound represented by the following formula (4) with a compound represented by the following formula (5) to obtain a compound represented by the following formula (2):

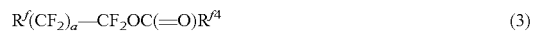

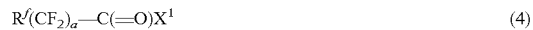

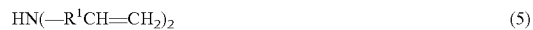

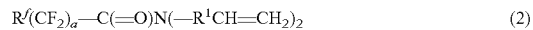

wherein $R^f$ is a linear polyfluoroalkoxy group having at least two carbon atoms and at least one etheric oxygen atom between carbon atoms, $R^{fA}$ is a $C_{1-30}$ perfluoroalkyl group or a $C_{2-30}$ perfluoroalkyl group having an etheric oxygen atom between carbon atoms, $X^1$ is a halogen atom, $R^1$ is an alkylene group, and a is an integer of from 1 to 5.

[2] The process for producing a fluorinated ether compound according to [1], wherein $R^f$ is a linear perfluoroalkoxy group having at least two carbon atoms and at least one etheric oxygen atom between carbon atoms.

[3] The process for producing a fluorinated ether compound according to [1], wherein $R^f(CF_2)_a$— is a group represented by the following formula (7):

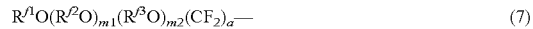

wherein m1 is an integer of from 0 to 10, m2 is an integer of from 2 to 200, $R^{f1}$ is a $C_{1-20}$ linear perfluoroalkyl group when m1 is 0, or a $C_{1-20}$ linear perfluoroalkyl group or a $C_{2-20}$ linear perfluoroalkyl group having at least one etheric oxygen atom between carbon atoms when m1 is at least 1, $R^{f2}$ is a $C_{1-10}$ linear fluoroalkylene group having at least one hydrogen atom, provided that when m1 is at least 2, $(R^{f2}O)_{m1}$ may be composed of at least two kinds of $R^{f2}O$ different in either or both of the number of carbon atoms and the number of hydrogen atoms, and $R^{f3}$ is a $C_{1-10}$ linear perfluoroalkylene group, provided that $(R^{f3}O)_{m2}$ may be composed of at least two kinds of $R^{f3}O$ different in the number of carbon atoms.

[4] The process for producing a fluorinated ether compound according to [3], wherein m1 is an integer of from 0 to 3.

[5] The process for producing a fluorinated ether compound according to [3] or [4], wherein $(R^{f3}O)_{m2}$ is $\{(CF_2O)_{m21}(CF_2CF_2O)_{m22}\}$ (wherein each of m21 and m22 is an integer of at least 1, and m21+m22 is an integer of from 2 to 200, provided that each $CF_2O$ and each $CF_2CF_2O$ may be bonded in any order) or $(CF_2CF_2OCF_2CF_2CF_2CF_2O)_{m25}CF_2CF_2O$ (wherein m25 is an integer of from 1 to 99).

[6] The process for producing a fluorinated ether compound according to any one of [3] to [5], wherein $R^f(CF_2)_a$— is a group represented by the following formula (7-1), a group represented by the following formula (7-2) or a group represented by the following formula (7-3):

$$R^{f11}O\{(CF_2O)_{m21}(CF_2CF_2O)_{m22}\}CF_2— \quad (7-1)$$

$$R^{f11}OCHFCF_2OCH_2CF_2O\{(CF_2O)_{m21}(CF_2CF_2O)_{m22}\}CF_2— \quad (7-2)$$

$$R^{f11}O(CF_2CF_2OCF_2CF_2CF_2CF_2O)_{m25}CF_2CF_2OCF_2CF_2CF_2— \quad (7-3)$$

wherein $R^{f11}$ is a $C_{1-20}$ perfluoroalkyl group,
each of m21 and m22 is an integer of at least 1, and m21+m22 is an integer of from 2 to 200, provided that each $CF_2O$ and each $CF_2CF_2O$ may be bonded in any order, and m25 is an integer of from 1 to 99.

[7] The process for producing a fluorinated ether compound according to [3], wherein m1 is 0.

[8] The process for producing a fluorinated ether compound according to any one of [1] to [7], wherein the compound represented by the formula (5) is diallylamine.

[9] The process for producing a fluorinated ether compound according to any one of [1] to [8], wherein the compound (3) or the compound (4) is reacted with the compound (5) in a liquid medium.

[10] A process for producing a fluorinated ether compound, which comprises obtaining a compound represented by the formula (2) by the process for producing a fluorinated ether compound as defined in any one of [1] to [9], and reacting the compound represented by the formula (2) with a compound represented by the following formula (6) to obtain a compound represented by the following formula (1):

$$HSiR^2{}_nL_{3-n} \quad (6)$$

$$R^f(CF_2)_a—C(=O)N(—R^1CH_2CH_2SiR^2{}_nL_{3-n})_2 \quad (1)$$

wherein $R^2$ is a monovalent hydrocarbon group,
L is a hydrolysable group, and
n is an integer of from 0 to 2.

[11] The process for producing a fluorinated ether compound according to [10], wherein $R^2$ is an alkyl group having at most 4 carbon atoms.

[12] The process for producing a fluorinated ether compound according to [10] or [11], wherein L is an alkoxy group having at most 4 carbon atoms or a chlorine atom.

Advantageous Effects of Invention

According to the processes for producing fluorinated ether compounds of the present invention, fluorinated ether compounds which can impart excellent water/oil repellency, abrasion resistance, fingerprint stain removability and lubricity to a substrate surface and a hard coat layer can be produced easily in a high yield.

DESCRIPTION OF EMBODIMENTS

In this specification, a compound represented by the formula (1) will be referred to as compound (1). Compounds represented by other formulae will be referred to in the same manner.

The chemical formula for an oxyperfluoroalkylene group will be so written that the oxygen atom comes on the right of the perfluoroalkylene group. The same applies to the formulae for other oxyfluoroalkylene groups.

The following terms in this specification have the following meanings.

An "etheric oxygen atom" means an oxygen atom which forms an ether bond (—O—) between carbon atoms.

A "hydrolyzable silyl group" means a group capable of forming a silanol group (Si—OH) upon hydrolysis, such as $SiR^3{}_nL_{3-n}$ in the formula (1).

The "number average molecular weight" of a fluorinated ether compound is measured by NMR spectrometry and calculated as follows.

It is calculated from the number (average value) of oxyperfluoroalkylene groups per a terminal group determined by $^1$H-NMR and $^{19}$F-NMR. The terminal group is, for example, $R^{f1}$ or $SiR^3{}_nL_{3-n}$ in the formulae.

The first embodiment of the fluorinated ether compounds obtained by the processes of the present invention (hereinafter also referred to simply as the compounds of the present invention) is compound (2):

$$R^f(CF_2)_a—C(=O)N(—R^1CH=CH_2)_2 \quad (2)$$

wherein $R^f$ is a linear polyfluoroalkoxy group having at least two carbon atoms and at least one etheric oxygen atom between carbon atoms, $R^1$ is an alkylene group, and a is an integer of from 1 to 5.

The second embodiment of the compounds of the present invention obtained by the processes of the present invention is compound (1):

$$R^f(CF_2)_a—C(=O)N(—R^1CH_2CH_2SiR^2{}_nL_{3-n})_2 \quad (1)$$

wherein $R^f$, $R^1$ and a are the same as $R^f$, $R^1$ and a in the formula (2), $R^2$ is a monovalent hydrocarbon group, L is a hydrolyzable group, and n is an integer of from 0 to 2.

Compound (2) can be used as a water/oil repellent hard-coat-layer additive to be added to a hard-coat-layer-forming composition to impart fingerprint stain removability, oil-based ink repellency and the like to the resulting hard coat layer. Compound (2) can also be used as an intermediate for production of compound (1).

Compound (1) can be used as an anti-fingerprint agent which forms a surface layer having fingerprint stain removability on a substrate surface.

Because of the presence of $R^f(CF_2)_a—$, the compounds of the present invention have high fluorine atom contents. Therefore, the compounds of the present invention can impart excellent water/oil repellency, abrasion resistance and fingerprint stain removability to a surface layer formed from an anti-fingerprint agent (hereinafter sometimes referred to simply as surface layer) and a hard coat layer.

Because $R^f(CF_2)_a—$ has a linear structure, the surface layer and the hard coat layer are excellent in abrasion resistance and lubricity. In contrast, conventional fluorinated ether compounds having a branched poly(oxyperfluoroalkylene) group cannot impart sufficient abrasion resistance and lubricity to a surface layer and a hard coat layer.

As $R^f$, a linear perfluoroalkyl group having at least two carbon atoms and having at least one etheric oxygen atom between carbon atoms is favorable for better water/oil repellency, abrasion resistance and fingerprint stain removability of the surface layer and the hard coat layer.

As $R^f(CF_2)_a—$, a group represented by the following formula (7) is favorable for better water/oil repellency, abrasion resistance, fingerprint stain removability and lubricity of the surface layer and the hard coat layer:

$$R^{f1}O(R^{f2}O)_{m1}(R^{f3}O)_{m2}(CF_2)_a— \quad (7)$$

wherein m1 is an integer of from 0 to 10, m2 is an integer of from 2 to 200,
when m1 is 0, $R^{f1}$ is a $C_{1-20}$ linear perfluoroalkyl group, and when m1 is at least 1, $R^{f1}$ is a $C_{1-20}$ linear perfluoroalkyl group or a $C_{2-20}$ linear perfluoroalkyl group having at least one etheric oxygen atom between carbon atoms, $R^{f2}$ is a $C_{1-10}$ linear fluoroalkylene group having at least one hydrogen atom, provided that when m1 is at least 2, $(R^{f2}O)_{m1}$ may be composed of at least two kinds of $R^{f2}O$ different in either or both of the number of carbon atoms and the number of hydrogen atoms, and $R^{f3}$ is a $C_{1-10}$ linear perfluoroalkylene group, provided that $(R^{f3}O)_{m2}$ may be composed of at least two kinds of $R^{f3}O$ different in the number of carbon atoms.

The number of carbon atoms in $R^{f1}$ is preferably from 1 to 6, particularly preferably from 1 to 3, for better lubricity and abrasion resistance of the surface layer and the hard coat layer.

$R^{f1}$ may be, for example, $CF_3$—, $CF_3CF_2$— or $CF_3CF_2CF_2$—. When m1 is at least 1, $CF_3OCF_2CF_2$—, $CF_3CF_2OCF_2CF_2$— and $CF_3CF_2CF_2OCF_2CF_2$— may also be mentioned.

The terminal $CF_3$-group in $R^{f1}$ constitutes $CF_3$— at at least one end of the compounds of the present invention. The compounds of the present invention having such a structure forms a surface layer having low surface energy which is excellent in lubricity and abrasion resistance.

The number of hydrogen atoms in $R^{f2}$ is at least 1, preferably at least 2, particularly preferably at least 3 for good appearance of the surface layer and the hard coat layer. The maximum number of hydrogen atoms in $R^{f2}$ is preferably (the number of carbon atoms in $R^{f2}$) for better water/oil repellency of the surface layer and the hard coat layer.

The hydrogen-containing $R^{f2}$ makes the compounds of the present invention more soluble in a liquid medium and hence makes compound (1) less unlikely to agglomerate. Therefore, a surface layer and a hard coat layer having better appearance are obtained.

The number of carbon atoms in $R^{f2}$ is preferably from 1 to 6, particularly preferably from 1 to 3 for better lubricity and abrasion resistance of the surface layer and the hard coat layer.

When m1 is not 0, m1 is preferably an integer of at most 5, particularly preferably an integer of from 1 to 3. When m1 is not smaller than the lower limit of the above-mentioned range, the resulting surface layer and the hard coat layer have good appearance. When m1 is not larger than the upper limit of the above-mentioned range, the resulting surface layer and the hard coat layer are excellent in water/oil repellency, abrasion resistance, fingerprint stain removability and lubricity.

When $(R^{f2}O)_{m1}$ is composed of at least two kinds of $R^{f2}O$, each $R^{f2}O$ may be bonded in any order without particular restrictions.

In view of easy production of the compounds of the present invention, m1 in $(R^{f2}O)_{m1}$ is preferably 0, and when m1 is not 0, $(R^{f2}O)_{m1}$ is preferably a group selected from the group consisting of —$CHFCF_2OCH_2CF_2O$—, —$CF_2CHFCF_2OCH_2CF_2O$—, —$CF_2CF_2CHFCF_2OCH_2CF_2O$— and —$CF_2CH_2OCH_2CF_2O$—.

$R^{f3}$ is preferably a $C_{1-6}$ linear perfluoroalkylene group for better abrasion resistance and lubricity of the surface layer and the hard coat layer, more preferably a $C_{1-4}$ linear perfluoroalkylene group, particularly preferably a $C_{1-2}$ linear perfluoroalkylene group for better lubricity of the surface layer and the hard coat layer.

The compounds of the present invention having $(R^{f3}O)_{m2}$ have higher fluorine atom contents and hence form a surface layer and a hard coat layer having better water/oil repellency, abrasion resistance and fingerprint stain removability.

Because $R^{f3}$ is a linear perfluoroalkylene group, $(R^{f3}O)_{m2}$ has a linear structure. The compounds of the present invention having such a structure form a surface layer and a hard coat layer excellent in abrasion resistance and lubricity.

m2 is preferably an integer of from 5 to 150, particularly preferably an integer of from 10 to 100. When m2 is not smaller than the lower limit of the above-mentioned range, the resulting surface layer and hard coat layer are excellent in water/oil repellency. When m2 is not larger than the upper limit of the above-mentioned range, the resulting surface layer and hard coat layer are excellent in abrasion resistance. Namely, when the compounds of the present invention have too large number average molecular weights, abrasion resistance is poor because the number of hydrolyzable silyl groups or polymerizable carbon-carbon double bonds per a unit molecular weight is small.

When $(R^{f3}O)_{m2}$ is composed of at least two kinds of $R^{f3}O$, each $R^{f3}O$ may be bonded in any order without particular restrictions. For example, in the case of $CF_2O$ and $CF_2CF_2O$, $CF_2O$ and $CF_2CF_2O$ may be arranged randomly, alternately or in blocks.

$(R^{f3}O)_{m2}$ is preferably $\{(CF_2O)_{m21}(CF_2CFO)_{m22}\}$, $(CF_2CF_2O)_{m23}$, $(CF_2CF_2CF_2O)_{m24}$ or $(CF_2CF_2OCF_2CF_2CF_2O)_{m25}CF_2CF_2O$, particularly preferably $\{(CF_2O)_{m21}(CF_2CF_2O)_{m22}\}$ or $(CF_2CF_2OCF_2CF_2CF_2O)_{m25}CF_2CF_2O$ for excellent abrasion resistance, fingerprint stain removability and lubricity of the surface layer and the hard coat layer.

Herein, m21 is an integer of at least 1, m22 is an integer of at least 1, m21+m22 is an integer of from 2 to 200, provided that each $CF_2O$ and each $CF_2CF_2O$ may be bonded in any order, m23 and m24 are integers of from 2 to 200, and m25 is an integer of from 1 to 99.

a is an integer of from 1 to 5. a depends on the number of carbon atoms in $R^{f3}$.

For example, $(CF_2)_a$ is —$CF_2$— when $(R^{f3}O)_{m2}$ is $\{(CF_2O)_{m21}(CF_2CF_2O)_{m22}\}$ or $(CF_2CF_2O)_{m23}$, —$CF_2CF_2$— when $(R^{f3}O)_{m2}$ is $(CF_2CF_2CF_2O)_{m24}$, or —$CF_2CF_2CF_2$— when $(R^{f3}O)_{m2}$ is $(CF_2CF_2O—CF_2CF_2CF_2CF_2O)_{m25}CF_2CF_2O$.

The compounds of the present invention having linear $(CF_2)_a$ form a surface layer and a hard coat layer excellent in abrasion resistance and lubricity.

The group represented by the formula (7) is preferably a group represented by the following formula (7-1), a group represented by the following formula (7-2) or a group represented by the following formula (7-3), more preferably a group represented by the following formula (7-3), in view of excellent water/oil repellency, abrasion resistance, fingerprint stain removability, lubricity and appearance of the surface layer and the hard coat layer and easy production of the compounds of the present invention.

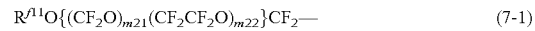

$R^{f11}O\{(CF_2O)_{m21}(CF_2CF_2O)_{m22}\}CF_2$—     (7-1)

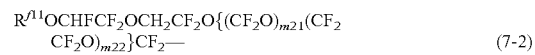

$R^{f11}OCHFCF_2OCH_2CF_2O\{(CF_2O)_{m21}(CF_2CF_2O)_{m22}\}CF_2$—     (7-2)

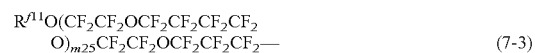

$R^{f11}O(CF_2CF_2OCF_2CF_2CF_2CF_2O)_{m25}CF_2CF_2OCF_2CF_2$—     (7-3)

Herein, $R^{f11}$ is a $C_{1-20}$ linear perfluoroalkyl group, each of m21 and m22 is an integer of at least 1, m21+m22 is an integer of from 2 to 200, provided that each $CF_2$ and each $CF_2CF_2O$ may be bonded in any order, and m25 is an integer of from 1 to 99.

$R^1$ is an alkylene group.

$R^1$ is preferably a $C_{1-4}$ alkylene group, particularly preferably —$CH_2$— in view of easy production of the compounds of the present invention.

$SiR^2{}_nL_{3-n}$ is a hydrolyzable silyl group.

Compound (1) has a terminal hydrolyzable silyl group. Compound (1) having such a structure forms a firm chemical bond with a substrate.

L is a hydrolyzable group, which is capable of forming a hydroxyl group upon hydrolysis. Namely, the terminal Si-L group in compound (1) turns into a silanol group (Si—OH) upon hydrolysis. The silanol group further reacts intermolecularly to form a Si—O—Si linkage. The silanol group also undergoes dehydration condensation with a hydroxyl group on the surface of a substrate to form a chemical bond (substrate-O—Si).

L may, for example, be an alkoxy group, a halogen atom, an acyl group or an isocyanato group (—NCO). The alkoxy group is preferably a $C_{1-4}$ alkoxy group. As the halogen atom, a chlorine atom is preferred, and as the acyl group, a $C_{2-5}$ acyl group is preferred.

L is preferably a $C_{1-4}$ alkoxy group or a halogen atom in view of easy production of compound (1). As the halogen atom, a chlorine atom is particularly preferred. L is preferably a $C_{1-4}$ alkoxy group for less outgassing during coating and excellent storage stability of compound (1), and particularly preferably an ethoxy group for long-lasting storage stability of compound (1), or a methoxy group for a shorter reaction time after coating.

$R^2$ is a monovalent hydrocarbon group. The monovalent hydrocarbon group may, for example, be an alkyl group, a cycloalkyl group, an alkenyl group or an aryl group.

$R^2$ is preferably an alkyl group. The number of carbon atoms in the alkyl group is preferably from 1 to 6, more preferably from 1 to 3, particularly preferably 1 or 2. When the number of carbon atoms in $R^2$ is within this range, compound (1) is easy to produce.

n is preferably 0 or 1, particularly preferably 0. The presence of a plurality of L in one hydrolyzable silyl group enables formation of a stronger bond with a substrate.

$SiR^2{}_nL_{3-n}$ is preferably $Si(OCH_3)_3$, $SiCH_3(OCH_3)_2$, $Si(OCH_2CH_3)_3$, $SiCl_3$, $Si(OCOCH_3)_3$ or $Si(NCO)_3$. $Si(OCH_3)_3$ is particularly preferred in view of easy handling in industrial production.

(The Compounds of the Present Invention)

The compounds of the present invention may be a single compound composed of one kind of compound (1), a single compound of compound (2), a mixture of at least two kinds of compounds (1) different in $R^f$, $R^1$, a, $SiR^2{}_nL_{3-n}$ and the like, or a mixture of at least two kinds of compound (2).

In the present invention, a single compound means that it is composed of compounds which are identical except for the number of oxyfluoroperfluoroalkylene groups in $R^f$. For example, when $R^f(CF_2)_a$— is represented by the formula (7-1), the compounds of the present invention are usually produced as a mixture of plural kinds of compounds different in m21 and m22, and such a mixture is considered as a single kind of the compound of the present invention.

The number average molecular weights of the present compounds are preferably from 1,000 to 15,000, more preferably from 1,500 to 10,000, particularly preferably from 2,000 to 8,000. When the number average molecular weights of the present compounds are within the above-mentioned range, the resulting surface layer and hard coat layer are excellent in abrasion resistance.

The first embodiment of the processes for producing the compounds of the present invention comprises reacting compound (3) or compound (4) with compound (5) to obtain compound (2).

  (3)

  (4)

  (5)

  (2)

Herein, $R^f$, $R^1$ and a are the same as mentioned above, $R^{f4}$ is a $C_{1-30}$ perfluoroalkyl group or a $C_{2-30}$ perfluoroalkyl group having an etheric oxygen atom between carbon atoms, and $X^1$ is a halogen atom.

$R^{f4}$ is preferably a group having a small number of carbon atoms to make it easy to separate compound (2) from by-products having $R^{f4}$ by column purification or the like, and is particularly preferably a $C_{1-20}$ perfluoroalkyl group or a $C_{2-20}$ perfluoroalkyl group having an etheric oxygen atom between carbon atoms.

$X^1$ is particularly preferably a fluorine atom in view of easy availability of compound (4).

Compound (3) and compound (4) are produced, for example, as described in WO2013/121984, WO2014/163004, WO2015/087902 or the like.

Compound (5) may, for example, be diallylamine, di(3-butenyl)amine, di(4-pentenyl)amine, di(5-hexenyl)amine or the like, and is particularly preferably diallylamine in view of easy availability of compound (5).

It is possible to produce compound (2) of interest by reacting appropriate choices of compound (3), compound (4) and compound (5).

For example, compound (3) or compound (4) is reacted with compound (5) in a liquid medium to obtain a crude product containing compound (2) and by-products. Compound (2) is isolated from the crude product by a known method (such as column purification).

As the liquid medium, a fluorinated organic solvent may be mentioned.

The fluorinated organic solvent may, for example, be a fluorinated alkane, a fluorinated aromatic compound, a fluoroalkyl ether, a fluorinated alkylamine or a fluoroalcohol.

The fluorinated alkane is preferably a $C_{4-8}$ compound. As commercially available products, for example, $C_6F_{13}H$ (ASAHIKLIN (registered trademark) AC-2000, manufactured by Asahi Glass Company, Limited), $C_6F_{13}C_2H_5$ (ASAHIKLIN (registered trademark) AC-6000, manufactured by Asahi Glass Company, Limited) and $C_2F_5CHFCHFCF_3$ (Vertrel (registered trademark) XF, manufactured by The Chemours Company) may, for example, be mentioned.

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. As commercially available products, for example, $CF_3CH_2OCF_2CF_2H$ (ASAHIKLIN (registered trademark) AE-3000, manufactured by Asahi Glass Company, Limited), $C_4F_9OCH_3$ (Novec (registered trademark) 7100, manufactured by Sumitomo 3M Limited), $C_4F_9OC_2H_5$ (Novec (registered trademark) 7200, manufactured by Sumitomo 3M Limited) and $C_2F_5CF(OCH_3)C_3F_7$ (Novec (registered trademark) 7300, manufactured by Sumitomo 3M Limited) may, for example, be mentioned.

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The reaction of compound (5) with compound (3) or compound (4) proceeds without heating upon just mixing them and hence gives a good yield of compound (2) easily.

The reaction temperature is usually from 0 to 40° C. The reaction time is usually from 0.5 to 8 hours.

The second embodiment of the processes for producing the compounds of the present invention comprises reacting compound (2) with compound (6) to obtain compound (1).

  (2)

  (6)

  (1)

Herein, $R^f$, $R^1$, a, $R^2$, L and n are the same as defined above.

As compound (6), trimethoxysilane, triethoxysilane, methyldimethoxysilane, trichlorosilane or the like may be mentioned, and trimethoxysilane is preferred.

It is possible to produce compound (1) of interest by reacting appropriate choices of compound (2) and compound (6).

For example, compound (2) is hydrosilylated with compound (6) in a liquid medium to obtain compound (1).

As the liquid medium, a fluorinated organic solvent may be mentioned.

The hydrosilylation proceeds in the presence of a transition metal catalyst or a radical generator without heating upon just mixing compound (2) and compound (6) and hence gives a good yield of compound (1) easily.

The reaction temperature is usually from 0 to 100° C. The reaction time is usually from 1 to 24 hours.

Compound (1) can be used as an anti-fingerprint agent.

The anti-fingerprint agent may consist solely of compound (1) or may be a composition comprising compound (1) and a fluorinated ether compound other than compound (1) (hereinafter referred to also as composition (A)) or a coating liquid comprising compound (1) or composition (A) and a liquid medium (hereinafter referred to also as coating liquid (C)).

Surface treatment of the surface of a substrate with an anti-fingerprint agent gives an article comprising a substrate and a surface layer formed on the surface of the substrate from compound (1) or composition (A) (hereinafter referred to also as article (E)).

Composition (A) comprises compound (1) and a fluorinated ether compound other than compound (1). But it does not contain a liquid medium.

As the other fluorinated ether compounds, fluorinated ether compounds produced as by-products during production of compound (1) (hereinafter referred to as fluorinated ether by-product compounds) and known fluorinated ether compounds used in the same applications as compound (1) may be mentioned.

The other fluorinated ether compounds are preferably those unlikely to impair the properties of compound (1).

As the fluorinated ether by-product compounds, fluorinated ether compounds having unreacted hydroxyl groups derived from the starting material for compound (3) or compound (4), and fluorinated ether compounds formed through isomerization of some of the —$R^1$CH═CH$_2$ groups into an inner olefin accompanying hydrosilylation during the production of compound (1) may, for example, be mentioned.

As the known fluorinated ether compounds, commercially available fluorinated ether compounds may, for example, be mentioned. When composition (A) contains known fluorinated ether compounds, they may have new effects to complement the properties of compound (1).

The content of compound (1) in composition (A) is preferably more than 60 mass % and at most 100 mass %, more preferably at least 70 mass % and at most 100 mass %, particularly preferably at least 80 mass % and at most 100 mass %.

The content of other fluorinated ether compounds in composition (A) is at least 0 mass % and less than 40 mass %, more preferably at least 0 mass % and at most 30 mass %, particularly preferably at least 0 mass % and at most 20 mass %.

The total content of compound (1) and other fluorinated ether compounds in composition (A) is from 80 to 100 mass %, particularly from 85 to 100 mass %.

When the contents of compound (1) and other fluorinated ether compounds are within the above-mentioned ranges, the resulting surface layer is excellent in water/oil repellency, abrasion resistance, fingerprint stain removability, lubricity and appearance.

Composition (A) may contain impurities in addition to compound (1) and other fluorinated ether compounds as long as they do not impair the effects of the present invention. The impurities may, for example, by-products formed during production of compound (1) or known fluorinated ether compounds (exclusive of fluorinated by-product compounds) or compounds unavoidable in production of compound (1) or a known fluorinated ether compound such as unreacted starting materials.

Coating liquid (C) is prepared to make it easy to spread compound (1) or composition (A) onto a substrate. Coating liquid (C) may be any liquid and may be a solution or a dispersion.

Coating liquid (C) comprises compound (1) or composition (A), and a liquid medium. Coating liquid (C) may, if necessary, further contain coating liquid additives.

The liquid medium is preferably an organic solvent. The organic solvent may be a fluorinated organic solvent or a non-fluorinated organic solvent, or may contain both solvents.

The fluorinated organic solvent may be such a fluorinated organic solvent as mentioned previously.

The non-fluorinated organic solvent is preferably a compound composed solely of hydrogen atoms and carbon atoms or a compound composed solely of hydrogen atoms, carbon atoms and oxygen atoms, and may, for example, be a hydrocarbon organic solvent, an alcohol organic solvent, a ketone organic solvent, an ether organic solvent or an ester organic solvent.

As the coating liquid additive, an acid catalyst or a basic catalyst, which catalyzes hydrolysis of the hydrolyzable silyl group and a condensation reaction, etc. may be mentioned.

The content of compound (1) or composition (A) in coating liquid (C) is preferably from 0.001 to 10 mass %, particularly preferably from 0.01 to 1 mass %.

The concentration of coating liquid additives in coating liquid (C) is preferably at most 0.1 mass %, particularly preferably at most 0.01 mass %.

Article (E) comprises a substrate and a surface layer formed on the substrate from compound (1) or composition (A).

The surface layer contains all or some of the hydrolyzable silyl groups of compound (1) in the hydrolyzed form.

The surface layer is preferably from 1 to 100 nm thick, particularly preferably from 1 to 50 nm thick. A thickness not lower than the lower limit of the above-mentioned range allows the surface layer to have sufficient effect. It is economical that the surface layer is not thicker than the upper limit of the above-mentioned range. The thickness of the surface layer can be calculated from the oscillation period of an interference pattern of reflected X-ray measured by X-ray reflectivity with an X-ray diffractometer ATX-G (manufactured by Rigaku Corporation).

The substrate is not particularly limited so long as it is required to be water/oil repellent. The material for the substrate may, for example, be a metal, resin, glass, sapphire, ceramics, stone or a composite material thereof. The glass may be chemically tempered glass. The substrate surface may be primed with a $SiO_2$ coating or the like.

The substrate is preferably a touch panel substrate or a display substrate, particularly preferably a touch panel substrate. The material for the touch panel substrate is preferably glass or transparent resin.

Article (E) can be produced, for example, by the following methods.

A method for producing article (E), which comprises treating the surface of a substrate with compound (1) or composition (A) by dry coating.

A method for producing article (E), which comprises applying coating liquid (C) to the surface of a substrate by wet coating and drying the coating liquid.

As dry coating techniques, vacuum vapor deposition, CVD, sputtering or the like may be mentioned. With a view to suppressing decomposition of compound (1) and in view of simplicity of apparatus, vacuum vapor deposition can be suitably used.

As techniques for wet coating, spin coating, wipe coating, spray coating, squeegee coating, dip coating, die coating, ink-jet coating, flow coating, roll coating, casting, a Langmuir-Blodgett deposition, gravure coating or the like may be mentioned.

The hard-coat-layer-forming composition comprises compound (2).

The hard-coat-layer-forming composition may be a photocurable composition comprising compound (2) and a photopolymerizable compound (other than compound (2)) and a photopolymerization initiator (hereinafter referred to as composition (B)) or a coating liquid comprising composition (B) and a liquid medium (hereinafter referred to as coating liquid (D)).

Composition (B) and coating liquid (D) are suitably used to form a hard coat layer on a substrate made of a resin less heat resistant than glass because they form a coating which cures without heating (hereinafter an article having a hard coat layer formed from composition (B) on a substrate is referred to as article (F)).

(Composition (B))

Composition (B) comprises compound (2), a photopolymerizable compound (other than compound (2)) and a photopolymerization initiator. But it does not contain a liquid medium. Composition (B) may, if necessary, further contain additives for photocurable compositions.

A photopolymerizable compound is a compound which starts polymerizing upon irradiation with light in the presence of a photopolymerization initiator.

The photopolymerizable compound may be a non-fluorinated photopolymerizable compound or a fluorinated photopolymerizable compound (other than compound (2)). A non-fluorinated photopolymerizable compound is preferred because it is prepared from an easily available starting material and hence is economical.

The photopolymerizable compound may be a polyfunctional monomer or a monofunctional monomer. The photopolymerizable compound preferably contains a polyfunctional monomer as an essential component because a hard coat layer with abrasion resistance would be obtained.

The photopolymerizable compound may be a single compound or a combination of two or more photopolymerization compounds.

The photopolymerization initiator may be a known photopolymerization initiator. The photopolymerization initiator may be a single compound or a combination of two or more photopolymerization initiators.

The photopolymerization initiator may be used in combination with a photosensitizer such as an amine.

Additives for the photocurable composition include UV absorbers, light stabilizers, antioxidants, antistatic agents, surfactants, colorants, fillers, various resins and the like.

The amount of compound (2) in composition (B) is preferably from 0.01 to 5 mass %, more preferably from 0.02 to 4 mass %, particularly preferably from 0.05 to 3 mass %. When the amount of compound (2) is within the above-mentioned range, composition (B) has good cold storage stability and can form a hard coat layer having good appearance, abrasion resistance and fingerprint stain removability.

The content of the photopolymerization compound in composition (B) is preferably from 20 to 98.99 mass %, more preferably from 50 to 98.99 mass %, further preferably from 60 to 98.99 mass %, particularly preferably from 80 to 98.99 mass %. When the content of photopolymerization compound is within the above-mentioned range, composition (B) has good cold storage stability, and the resulting hard coat layer has good appearance, abrasion resistance and fingerprint stain removability.

The content of the photopolymerization initiator in composition (B) is preferably from 1 to 15 mass %, more preferably from 3 to 15 mass %, particularly preferably from 3 to 10 mass %. When the content of the photopolymerization initiator is within the above-mentioned range, it is compatible with the photocurable compound, and the photocurable composition cures well to form a hard cured film.

When additives for the photocurable composition are incorporated, the content of additives for the photocurable composition in composition (B) is preferably from 0.5 to 20 mass %, more preferably from 1 to 15 mass %, particularly preferably from 1 to 10 mass %.

Composition (B) may contain impurities such as compounds unavoidable in production of compound (2), as long as they do not impair the effects of the present invention.

(Coating Liquid (D))

Coating liquid (D) is prepared to make it easy to spread composition (B).

Coating liquid (D) may be any liquid and may be a solution or a dispersion.

Coating liquid (D) comprises composition (B) and a liquid medium.

The liquid medium is preferably an organic solvent. The organic solvent may be such a fluorinated organic solvent as mentioned previously or such a non-fluorinated organic solvent as mentioned previously, or may contain both solvents.

Article (F) comprises a substrate and a hard coat layer formed on the substrate from composition (B). Article (F) may further comprise a primer layer between the substrate and the hard coat layer to strengthen the bonding between the substrate and the hard coat layer.

The hard coat layer is preferably from 0.5 to 20 µm thick, particularly preferably from 1 to 15 µm, in view of abrasion resistance and fingerprint stain removability.

The substrate is a component which constitutes the main body or the surface of various articles (such as optical lenses, displays and optical recording media) which require abrasion resistance and fingerprint stain removability.

The material for the surface of the substrate may, for example, be a metal, resin, glass, sapphire, ceramics, stone or a composite material thereof. The glass may be chemically tempered glass. The substrate surface may be primed with a $SiO_2$ coating or the like. The material for the surface of a substrate for an optical lens, a display or an optical recording medium is preferably a glass or transparent resin substrate.

As the primer layer, a known primer layer may be mentioned. The primer layer is formed, for example, by applying a primer-layer-forming composition containing a liquid medium onto the substrate surface and distilling off the liquid medium.

Article (F) is produced, for example, through the following step (I) and step (II).

Step (I): an optional step of applying a primer-layer-forming composition onto a substrate surface to form a primer layer; and Step (II): a step of applying composition (B) or coating liquid (D) onto the surface of the substrate or the primer layer to form a coating, and when coating liquid (D) is used, removing the liquid medium and photocuring the coating to form a hard coat layer.

EXAMPLES

Now, the present invention will be described in further detail with reference to Examples, but the present invention is not limited to these Examples.

Hereinafter, "%" is "mass %" unless otherwise specified.

Ex. 1 to 4, 10, 12 to 15 and 18 to 21 are Examples of the present invention, and Ex. 5 to 9, 11, 16 to 17 and 22 to 23 are Comparative Examples.

[Raw Materials]

(Compound (3))

As compounds (3), the following compounds were obtained.

Compound (3-1): compound obtained in accordance with Example 11 (specifically Example 11-1 to 11-3) of WO2013/121984.

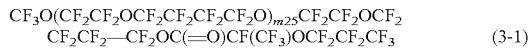
(3-1)

wherein average m25: 13, and the number average molecular weight: 5,050.

Compound (3-2): compound obtained in accordance with Preparation Example 6 of WO2015/087902.

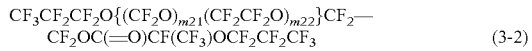
(3-2)

wherein average m21: 21, the average m22: 22, and the number average molecular weight: 4,550.

(Compound (4))

As compounds (4), the following compounds were obtained.

Compound (4-1): compound obtained in accordance with Example 11 (specifically Example 11-1 to 11-4) of WO2013/121984.

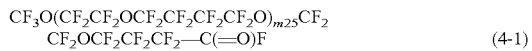
(4-1)

wherein the average m25: 13, and the number average molecular weight: 4,710.

Compound (4-2): compound obtained in accordance with Example 11 (specifically Example 11-1 to 11-4) of WO2013/121984 except that compound (3-2) was used as the starting material instead of compound (3-1).

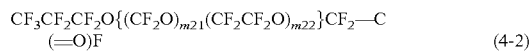
(4-2)

wherein the average m21: 21, the average m22: 22, and the number average molecular weight: 4,220.

(Compound (5))

As compounds (5), the following compound was obtained.

Compound (5-1): diallylamine (manufactured by KANTO CHEMICAL CO., INC.)

(Compound (6))

As compounds (6), the following compound was obtained.

Compound (6-1): trimethoxysilane (manufactured by TOKYO CHEMICAL INDUSTRY CO., LTD.)

(Compound (13))

As compound (13) to be used in Comparative Examples, the following compounds were obtained.

Compound (13-1): compound obtained in accordance with Example 6 of WO2013/121984.

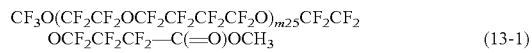
(13-1)

wherein the average m25: 13, and the number average molecular weight: 4,730.

Compound (13-2): compound obtained in accordance with Example 6 of WO2015/087902.

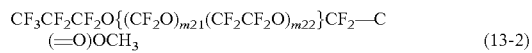
(13-2)

wherein the average m21: 21, the average m22: 22, the number average molecular weight: 4,230.

Ex. 1

In a 50 mL three-necked flask, 10.1 g of compound (3-1), 0.97 g of compound (5-1) and 10 g of 1,3-bis(trifluoromethyl)benzene were stirred at room temperature for 8 hours. The crude reaction solution was concentrated in an evaporator to obtain 9.8 g of a crude product. The crude product was separated by silica gel column chromatography to obtain 9.5 g of compound (2-1) (yield 99%).

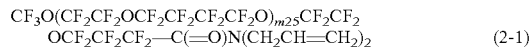
(2-1)

NMR Spectrum of Compound (2-1)

$^1$H-NMR (300.4 MHz, solvent: CDCl$_3$, standard: tetramethylsilane (TMS)) δ (ppm): 4.0 (4H), 5.3 to 5.4 (4H), 5.7 to 6.0 (2H).

$^{19}$F-NMR (282.7 MHz, solvent: CDCl$_3$, standard: CFCl$_3$) δ (ppm): −55.1 (3F), −82.6 (54F), −87.9 (54F), −90.0 (2F), −110.3 (2F), −124.1 (2F), −125.0 (52F).

Average m25: 13, and the number average molecular weight: 4,790.

In a 100 mL recovery flask made of a tetrafluoroethylene-perfluoro(alkoxy vinyl ether) copolymer, 5.0 g of compound (2-1), 0.03 g of a xylene solution of platinum/1,3-divinyl-1,1,3,3-tetramethyldisiloxane complex (platinum content: 2%), 0.36 g of compound (6-1), 0.01 g of aniline and 2.0 g of 1,3-bis(trifluoromethyl)benzene were stirred at room temperature for 8 hours. The solvent was distilled off under reduced pressure, and the residue was filtered through a membrane filter having a pore size of 0.5 μm to obtain 5.2 g of compound (1-1) (purity at least 99%, yield 99%).

CF$_3$O(CF$_2$CF$_2$OCF$_2$CF$_2$CF$_2$O)$_{m25}$CF$_2$CF$_2$
OCF$_2$CF$_2$CF$_2$—C(=O)N[CH$_2$CH$_2$CH$_2$Si(OCH$_3$)$_3$]$_2$  (1-1)

NMR Spectrum of Compound (1-1)
$^1$H-NMR (300.4 MHz, solvent: CDCl$_3$, standard: TMS) δ (ppm): 0.6 (4H), 1.8 (4H), 3.4 (4H), 3.6 (18H).
$^{19}$F-NMR (282.7 MHz, solvent: CDCl$_3$, standard: CFCl$_3$) δ (ppm): −55.2 (3F), −82.8 (54F), −88.1 (54F), −90.2 (2F), −111.4 (2F), −124.2 (2F), −125.2 (52F).

Average m25: 13, and the number average molecular weight: 5,040.

Ex. 2

9.3 g of compound (2-1) (yield: 97%) was obtained in the same manner as in Ex. 1 except that compound (3-1) was changed to 9.42 g of compound (4-1), and the amount of compound (5-1) was changed to 0.49 g.

5.1 g of compound (1-1) (purity at least 99%, yield 97%) was obtained in the same manner as in Ex. 1 except that compound (2-1) obtained in Ex. 2 was used.

Ex. 3

8.5 g of compound (2-2) (yield 99%) was obtained in the same manner as in Ex. 1 except that compound (3-1) was changed to 9.10 g of compound (3-2).

CF$_3$CF$_2$CF$_2$O{(CF$_2$O)$_{m21}$(CF$_2$CF$_2$O)$_{m22}$}CF$_2$—C(=O)N(CH$_2$CH=CH$_2$)$_2$  (2-2)

NMR Spectrum of Compound (2-2)
$^1$H-NMR (300.4 MHz, solvent: CDCl$_3$, standard: TMS) δ (ppm): 4.0 (4H), 5.3 to 5.4 (4H), 5.7 to 6.0 (2H).
$^{19}$F-NMR (282.7 MHz, solvent: CDCl$_3$, standard: CFCl$_3$) δ (ppm): −52.4 to −55.7 (42F), −72.5 (1F), −74.7 (1F), −82.2 (3F), −89.4 to −91.1 (90F), −130.5 (2F).

Average m21: 21, average m22: 22, and the number average molecular weight: 4,300.

5.2 g of compound (1-2) (purity at least 99%, yield 98%) was obtained in the same manner as in Ex. 1 except that compound (2-2) obtained in Ex. 3 was used.

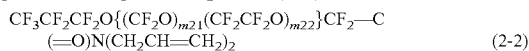
CF$_3$CF$_2$CF$_2$O{(CF$_2$O)$_{m21}$(CF$_2$CF$_2$O)$_{m22}$}CF$_2$—C(=O)N[CH$_2$CH$_2$CH$_2$Si(OCH$_3$)$_3$]$_2$  (1-2)

NMR Spectrum of Compound (1-2)
$^1$H-NMR (300.4 MHz, solvent: CDCl$_3$, standard: TMS) δ (ppm): 0.6 (4H), 1.8 (4H), 3.5 (4H), 3.6 (18H).
$^{19}$F-NMR (282.7 MHz, solvent: CDCl$_3$, standard: CFCl$_3$) δ (ppm): −52.4 to −55.8 (42F), −72.6 (1F), −74.8 (1F), −82.3 (3F), −89.4 to −91.1 (90F), −130.6 (2F).

Average m21: 21, average m22: 22, and the number average molecular weight: 4,540.

Ex. 4

8.4 g of compound (2-2) (yield 98%) was obtained in the same manner as in Ex. 2 except that compound (4-1) was changed to 8.4 g of compound (4-2).

5.2 g of compound (1-2) (purity at least 99%, yield 98%) was obtained in the same manner as in Ex. 1 except that compound (2-2) obtained in Ex. 4 was used.

Ex. 5

The procedure in Ex. 1 was followed by using 9.5 g of compound (13-1) instead of compound (3-1) and HN(CH$_2$CH$_2$CH$_2$Si(OCH$_3$)$_3$)$_2$ (manufactured by Gelest, Inc.) instead of compound (5-1), but according to $^1$H-NMR analysis, the attempted reaction completely failed. When the reaction temperature was raised to 120° C., the reaction solution became too viscous to stir in 24 hours and failed to give the desired product, compound (1-1).

Ex. 6

The procedure in Ex. 1 was followed by using 9.5 g of compound (13-1) instead of compound (3-1) and decreasing compound (5-1) to 0.24 g, but according to $^1$H-NMR analysis, the attempted reaction completely failed. When the reaction temperature was raised to 120° C., and the reaction time was prolonged to 24 hours, compound (2-1) was obtained with a 33% conversion and a 22% selectivity for compound (2-1) according to $^1$H-NMR analysis. The remaining 88% was the amine salt of the carboxylic acid resulting from hydrolysis triggered by a trace amount of water in either starting material.

The crude reaction solution was concentrated in an evaporator to obtain 9.6 g of a crude product. The crude product was separated by silica gel column chromatography to obtain 0.66 g of compound (2-1) (yield 7%).

Ex. 7

The procedure in Ex. 5 at room temperature was followed by using 8.5 g of compound (13-2) instead of compound (13-1), but according to $^1$H-NMR analysis, the attempted reaction almost failed. When the reaction temperature was raised to 80° C., and the reaction time was prolonged to 12 hours, compound (1-2) was obtained with a 100% conversion and a 94% selectivity for compound (1-2) according to $^1$H-NMR analysis. The remaining 6% was the amine salt of the carboxylic acid resulting from hydrolysis triggered by a trace amount of water in either starting material.

The solvent was distilled off, and the residue was filtered through a membrane filter having a pore size of 0.5 μm to obtain 4.8 g of compound (1-2) (purity 94%, yield 91%).

Ex. 8

The procedure in Ex. 6 at room temperature was followed by using 8.5 g of compound (13-2) instead of compound (13-1), but according to $^1$H-NMR analysis, the attempted reaction almost failed. When the reaction temperature was raised to 120° C., and the reaction time was prolonged to 12 hours, compound (2-2) was obtained with a 100% conversion and a 64% selectivity of compound (2-2). The remaining 36% was the amine salt of the carboxylic acid resulting from hydrolysis triggered by a trace amount of water in either starting material.

The crude reaction solution was concentrated in an evaporator to obtain 8.7 g of a crude product. The crude product was separated by silica gel column chromatography to obtain 5.2 g of compound (2-2) (yield 61%).

Ex. 9

Compound (X1) was obtained in accordance with Macromolecules 2009, 42, 612-619 (specifically Table 4, run 21).

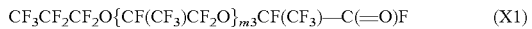
CF$_3$CF$_2$CF$_2$O{CF(CF$_3$)CF$_2$O}$_{m3}$CF(CF$_3$)—C(=O)F  (X1)

wherein average m3: 19, and the number average molecular weight: 3,490.

The procedure in Ex. 1 was followed by using 7.0 g of compound (X1) instead of compound (3-1) to obtain 7.1 g of compound (X2) (yield 99%)

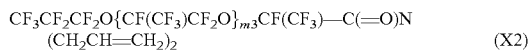
$$CF_3CF_2CF_2O\{CF(CF_3)CF_2O\}_{m3}CF(CF_3)-C(=O)N \\ (CH_2CH=CH_2)_2 \quad (X2)$$

NMR spectrum of compound (X2);
$^1$H-NMR (300.4 MHz, solvent: CDCl$_3$, standard: TMS) δ (ppm): 4.0 (4H), 5.3 to 5.4 (4H), 5.7 to 6.0 (2H).
$^{19}$F-NMR (282.7 MHz, solvent: CDCl$_3$, standard: CFCl$_3$) δ (ppm): −80.0 to −86.1 (103F), −130.2 (2F), −126.2 (2F), −145.1 (19F).

The average m3: 19, and the number average molecular weight: 3,560.

The procedure in Ex. 1 was followed by using compound (X2) to obtain 5.3 g of compound (X3) (purity at least 99%, yield 99%).

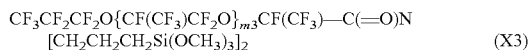
$$CF_3CF_2CF_2O\{CF(CF_3)CF_2O\}_{m3}CF(CF_3)-C(=O)N \\ [CH_2CH_2CH_2Si(OCH_3)_3]_2 \quad (X3)$$

NMR spectrum of compound (X3);
$^1$H-NMR (300.4 MHz, solvent: CDCl$_3$, standard: TMS) δ (ppm): 0.6 (4H), 1.8 (4H), 3.4 (4H), 3.6 (18H).
$^{19}$F-NMR (282.7 MHz, solvent: CDCl$_3$, standard: CFCl$_3$) δ (ppm): −80.0 to −86.0 (103F), −130.1 (2F), −126.1 (2F), −145.0 (19F).

Ex. 10

The reaction of compound (3-1) and compound (5-1) in Ex. 1 which gave compound (2-1) was conducted under the same conditions as in Ex. 1, and the reaction conversion was followed by $^{19}$F-NMR measurement at 0.5 hour intervals from the beginning of the stirring. The reaction conversion reached 98% in 0.5 hour and exceeded 99% in 1.0 hour.

Ex. 11

The reaction of compound (X1) and compound (5-1) in Ex. 9 which gave compound (X2) was conducted under the same conditions as in Ex. 9, and the reaction conversion was followed by $^{19}$F-NMR measurement at 0.5 hour intervals from the beginning of the stirring. The reaction conversion reached 88% in 0.5 hour and exceeded 99% in 2.5 hours.

[Summary of Ex. 1 to Ex. 11]

When compound (3) or compound (4) as a starting material was reacted with compound (5) as in Ex. 1 to Ex. 4, compound (2) was obtained in high yields, whereas the use of compound (13) as a starting material as in Ex. 6 and Ex. 8 resulted in lower yields.

Compound (1) was produced in high yields with high purities via hydrosilylation of compound (2) in Ex. 1 to Ex. 4, while direct conversion from compound (13) to compound (1) failed in Ex. 5, and resulted in a low purity and a low yield, though somewhat succeeded, in Ex. 7.

It was confirmed from comparison between Ex. 10 and Ex. 11 that a compound having a linear group as R$^f$ in the formula (3) used in Ex. 10 reacted faster, and a compound having a branched group as R$^f$ in the formula (3) gave a slower reaction in Ex. 11.

Ex. 12 to Ex. 17

Storage stability of the respective compounds (1) obtained in Ex. 1 to Ex. 4 and Ex. 7 and compound (X3) obtained in Ex. 9 was evaluated as follows. The results are shown in Table 1.

(Storage Stability)

Each compound (1) obtained in Ex. 1 to Ex. 4 and Ex. 7 was put in a sample vial and incubated at a temperature of 25° C. at a humidity of 40% RH. The state of each compound were observed by naked eye immediately after the production and before putting it into the vial (0 day), and on the 7th, 14th and 28th days after putting it into the vial and rated on the following scale.

○ (good): compound (1) was transparent
x (unacceptable): compound (1) contained floating solids and precipitates
x x (bad): compound (1) lacked fluidity.

TABLE 1

| | | Ex. | | | | | |
|---|---|---|---|---|---|---|---|
| | | 12 | 13 | 14 | 15 | 16 | 17 |
| Fluorinated ether compound | Kind | Ex. 1 Compound (1-1) | Ex. 2 Compound (1-1) | Ex. 3 Compound (1-2) | Ex. 4 Compound (1-2) | Ex. 7 Compound (1-2) | Ex. 9 Compound (X3) |
| | Purity (%) | ≥99 | ≥99 | ≥99 | ≥99 | 94 | ≥99 |
| Storage stability | Day 0 | ○ | ○ | ○ | ○ | ○ | ○ |
| | Day 7 | ○ | ○ | ○ | ○ | X | ○ |
| | Day 14 | ○ | ○ | ○ | ○ | XX | ○ |
| | Day 28 | ○ | ○ | ○ | ○ | XX | ○ |

The low-purity compound (1) obtained in Ex. 7 is liable to condense and hence poor in storage stability.

Ex. 18 to Ex. 23

Surface treatment of substrates was carried out with compound (1) obtained in Ex. 1 to Ex. 4 and Ex. 7 and compound (X3) obtained in Ex. 9 to give articles of Ex. 18 to Ex. 23. As the surface treatment method, the following dry coating and wet coating methods were, respectively, used for each Ex. As the substrates, chemically tempered glass was used. The resulting articles were evaluated by the following methods. The results are shown in Table 2.

(Dry Coating Method)

The dry coating was conducted by means of a vacuum vapor deposition apparatus (SGC-22WA, manufactured by SHOWA SHINKU CO., LTD.) (vacuum vapor deposition). 35 mg of compound (1) obtained in Ex. 1 to Ex. 4 or Ex. 7 and compound (X3) obtained in Ex. 9 was charged into a molybdenum boat in the vacuum vapor deposition apparatus, and the inside of the vacuum vapor deposition apparatus was evacuated to 5×10$^{-3}$ Pa or below. Each compound (1) was deposited on a substrate by heating the boat loading the compound to form a deposited film on the surface of the substrate. The substrate having the deposited film was incubated at a temperature of 25° C. at a humidity of 40% RH overnight to obtain an article having a surface layer on the substrate.

(Wet Coating Method)

Compound (1) obtained in Ex. 1 to Ex. 4 or Ex. 7 or compound (X3) obtained in Ex. 9 and AC-6000 as a liquid medium were mixed to prepare a coating liquid having a solid content of 0.1 mass %. The coating liquid was sprayed onto a substrate by means of a spray coater (manufactured by Nordson Corporation) to form a coating film on the substrate. The substrate having a coating film was baked at 120° C. for 20 minutes to obtain an article having a surface layer on the substrate.

(Evaluation Method)

<Method for Measuring Contact Angle>

A contact angle of about 2 μL of distilled water or n-hexadecane with a surface layer was measured with a contact angle meter (DM-500, manufactured by Kyowa Interface Science Co., Ltd.). Measurements are made at five different locations on the surface of the surface layer and averaged. For the calculation of the contact angle, the 2θ method was used.

<Initial Contact Angle>

With respect to a substrate having a surface-treated layer, the initial contact angles of water and n-hexadecane with a surface layer were measured by the above measuring method and rated on the following scale.

Initial Water Contact Angle:
⊚ (excellent): at least 115°
○ (good): at least 110° and less than 115°
Δ (acceptable): at least 100° and less than 110°
x (unacceptable): less than 100°

Initial n-Hexadecane Contact Angle
⊚ (excellent): at least 66°
○ (good): at least 65° and less than 66°
Δ (acceptable): at least 63° and less than 65°
x (unacceptable): less than 63°

<Abrasion Resistance (Against Steel Wool)>

A surface layer was rubbed with steel wool Bon Star (#0000) reciprocating at a speed of 320 cm/min 5,000 times under a pressure of 98.07 kPa using a reciprocating traverse tester (manufactured by KNT Co., Ltd.) in accordance with JIS L0849:2013 (ISO 105-X12: 2001), and then the water contact angle was measured. If the decrease in water repellency (water contact angle) observed after the rubs is small, the surface layer is excellent in abrasion resistance with little damage to its performance by the rubs. The scale for evaluations is given below.

⊚ (excellent): The water contact angle had changed by at most 5° after 5,000 reciprocating rubs.
○ (good): The water contact angle had changed by at least 5° and less than 10° after 5,000 reciprocating rubs.
Δ (acceptable): The water contact angle had changed by at least 10° and less than 20° after 5000 reciprocating rubs.
x (unacceptable): The water contact angle had changed by at least 20° after 5,000 reciprocating rubs.

<Abrasion Resistance (Against Eraser)>

A surface layer was rubbed with Rubber Eraser (manufactured by Minoan) reciprocating at a speed of 60 rpm 10,000 times under a load of 4.9 N using a reciprocating traverse tester (manufactured by KNT Co., Ltd.) in accordance with JIS L0849:2013 (ISO 105-X12: 2001), and then the water contact angle was measured. If the decrease in water repellency (water contact angle) observed after the rubs is small, the surface layer is excellent in abrasion resistance with little damage to its performance by the rubs. The scale for evaluations is given below.

⊚ (excellent): The water contact angle had changed by at most 5° after 10,000 reciprocating rubs.

○ (good): The water contact angle had changed by at least 5° and less than 10° after 10,000 reciprocating rubs.
Δ (acceptable): The water contact angle had changed by at least 10° and less than 20° after 10,000 reciprocating rubs.
x (unacceptable): The water contact angle had changed by at least 20° after 10,000 reciprocating rubs.

<Appearance>

The haze of an article was measured with a haze meter (manufactured by Toyo Seiki Seisaku-sho, Ltd.). A small haze means that the article has an even coating of a fluorinated ether compound and is excellent in appearance.

⊚ (excellent): The haze was at most 0.1%.
○ (good): The haze was higher than 0.1% and at most 0.2%.
Δ (acceptable): The haze was higher than 0.2% and at most 0.3%.
x (unacceptable): The haze was higher than 0.3%.

<Fingerprint Stain Removability>

An artificial fingerprint liquid (liquid consisting of oleic acid and squalene) was put on a flat surface of a silicone rubber stopper, and then, excess oil was wiped off by a nonwoven fabric (BEMCOT M-3, manufactured by Asahi Kasei Corporation), to prepare a fingerprint stamp. The fingerprint stamp was placed on a surface layer and pressed under a load of 9.8 N for 10 seconds. The haze at a portion stained with the fingerprint was measured by a haze meter and was taken as the initial value. Then, the portion of the surface layer stained with the fingerprint was wiped with tissue paper under a load of 4.9 N by means of a reciprocating traverse tester (manufactured by KNT Co., Ltd.). The haze was measured every single reciprocating wipe to determine the number of reciprocating rubs required to lower the haze from the initial value to 10% or below. A surface layer which requires few wipes is easy to remove a fingerprint stain from and is excellent in fingerprint removability. The scale for evaluations is given below.

⊚ (excellent): The number of required wipes was at most 3.
○ (good): The number of required wipes was from 4 to 5.
Δ (acceptable): The number of required wipes was from 6 to 8.
x (unacceptable): The number of required wipes was at least 9.

<Light Resistance>

A surface layer was irradiated with light rays (650 W/m$^2$, 300 to 700 nm) for 500 hours at a black panel temperature of 63° C. by means of a desk-top xenon arc lamp light fastness tester for accelerated tests equipped with a xenon lamp (SUNTEST XLS+, manufactured by Toyo Seiki Seisaku-sho, Ltd.), and then the water contact angle was measured. If the decrease in water contact angle observed after the accelerated light fastness test is small, the surface layer is excellent in light resistance with little damage to its performance by the light. The scale for evaluations is given below.

⊚ (excellent): The water contact angle had changed by at most 5° after the accelerated light fastness test.
○ (good): The water contact angle had changed by at least 5° and less than 10° after the accelerated light fastness test.
Δ (acceptable): The water contact angle had changed by at least 10° and less than 20° after the accelerated light fastness test.
x (unacceptable): The water contact angle had changed by at least 20° after the accelerated light fastness test.

<Lubricity>

The coefficient of kinetic friction between a surface layer and an artificial skin (PBZ13001, manufactured by Idemitsu Technofine Co., Ltd.) was measured over a contact area of 3 cm×3 cm under a load of 0.98 N. A surface layer having a smaller coefficient of kinetic friction is excellent in lubricity. The scale for evaluations is given below.

⊚ (excellent): The coefficient of kinetic friction was at most 0.3.

○ (good): The coefficient of kinetic friction was larger than 0.3 and at most 0.4.

Δ (acceptable): The coefficient of kinetic friction was larger than 0.4 and at most 0.5.

× (unacceptable): The coefficient of kinetic friction was larger than 0.5.

wherein $R^f$ is a linear polyfluoroalkoxy group having at least two carbon atoms and at least one etheric oxygen atom between carbon atoms, $R^{f4}$ is a $C_{1\text{-}30}$ perfluoroalkyl group or a $C_{2\text{-}30}$ perfluoroalkyl group having an etheric oxygen atom between carbon atoms, $R^1$ is an alkylene group, and a is an integer of from 1 to 5.

2. The process for producing a fluorinated ether compound according to claim 1, wherein $R^f$ is a linear perfluoroalkoxy group having at least two carbon atoms and at least one etheric oxygen atom between carbon atoms.

TABLE 2

| | | Ex. 18 | Ex. 19 | Ex. 20 | Ex. 21 | Ex. 22 | Ex. 23 |
|---|---|---|---|---|---|---|---|
| Fluorinated ether compound | Kind | Ex. 1 Compound (1-1) | Ex. 2 Compound (1-1) | Ex. 3 Compound (1-2) | Ex. 4 Compound (1-2) | Ex. 7 Compound (1-2) | Ex. 9 Compound (X3) |
| | Purity (%) | ≥99 | ≥99 | ≥99 | ≥99 | 94 | ≥99 |
| Dry coating | Initial contact angle Water | ⊚ | ⊚ | ⊚ | ⊚ | ⊚ | ⊚ |
| | n-Hexadecane | ⊚ | ⊚ | ⊚ | ⊚ | ⊚ | ⊚ |
| | Abrasion resistance (steel wool) | ○ | ○ | ○ | ○ | Δ | X |
| | Abrasion resistance (eraser) | ○ | ○ | ⊚ | ⊚ | ○ | X |
| Wet coating | Initial contact angle Water | ⊚ | ⊚ | ⊚ | ⊚ | ○ | ⊚ |
| | n-Hexadecane | ⊚ | ⊚ | ⊚ | ⊚ | ⊚ | ⊚ |
| | Abrasion resistance (steel wool) | ○ | ○ | ○ | ○ | X | X |
| | Abrasion resistance (eraser) | ○ | ○ | ⊚ | ⊚ | Δ | X |
| | Appearance | ○ | ○ | ○ | ○ | X | ○ |
| | Fingerprint stain removability | ⊚ | ⊚ | ⊚ | ⊚ | ⊚ | ○ |
| | Light resistance | ○ | ○ | ○ | ○ | ○ | ○ |
| | Lubricity | ○ | ○ | ⊚ | ⊚ | Δ | X |

The low-purity compound (1) obtained in Ex. 7 is liable to condense during storage. The surface layer formed on a substrate surface from condensed compound (1) was poor in abrasion resistance and appearance.

Compound (X3) obtained in Ex. 9 has a branched group as $R^f$ and formed a surface layer with poor abrasion resistance and lubricity.

INDUSTRIAL APPLICABILITY

The processes of the present invention can provide a fluorinated ether compound which is useful for surface treatment to impart water/oil repellency to a surface of a substrate such as a member of optical products, touch panels (surface to be touched by a finger), anti-reflection film and anti-reflection glass and can be used as a mold release.

This application is a continuation of PCT Application No. PCT/JP2017/029686, filed on Aug. 18, 2017, which is based upon and claims the benefit of priority from Japanese Patent Application No. 2016-167697 filed on Aug. 30, 2016. The contents of those applications are incorporated herein by reference in their entireties.

What is claimed is:

1. A process for producing a fluorinated ether compound, which comprises reacting a compound represented by the following formula (3) with a compound represented by the following formula (5) to obtain a compound represented by the following formula (2):

3. The process for producing a fluorinated ether compound according to claim 1, wherein $R^f(CF_2)_a$— is a group represented by the following formula (7):

wherein m1 is an integer of from 0 to 10, m2 is an integer of from 2 to 200, $R^{f1}$ is a $C_{1\text{-}20}$ linear perfluoroalkyl group when m1 is 0, or a $C_{1\text{-}20}$ linear perfluoroalkyl group or a $C_{2\text{-}20}$ linear perfluoroalkyl group having at least one etheric oxygen atom between carbon atoms when m1 is at least 1, $R^{f2}$ is a $C_{1\text{-}10}$ linear fluoroalkylene group having at least one hydrogen atom, provided that when m1 is at least 2, $(R^{f2}O)_{m1}$ may be composed of at least two kinds of $R^{f2}O$ different in either or both of the number of carbon atoms and the number of hydrogen atoms, and $R^{f3}$ is a $C_{1\text{-}10}$ linear perfluoroalkylene group, provided that $(R^{f3}O)_{m2}$ may be composed of at least two kinds of $R^{f3}O$ different in the number of carbon atoms.

4. The process for producing a fluorinated ether compound according to claim 3, wherein m1 is an integer of from 0 to 3.

5. The process for producing a fluorinated ether compound according to claim 3, wherein $(R^{f3}O)_{m2}$ is $\{(CF_2O)_{m21}(CF_2CF_2O)_{m22}\}$ (wherein each of m21 and m22 is an integer of at least 1, and m21+m22 is an integer of from 2 to 200, provided that each $CF_2O$ and each $CF_2CF_2O$ may be bonded in any order) or $(CF_2CF_2OCF_2CF_2CF_2CF_2O)_{m25}CF_2CF_2O$ (wherein m25 is an integer of from 1 to 99).

6. The process for producing a fluorinated ether compound according to claim 3, wherein $R^f(CF_2)_a—$ is a group represented by the following formula (7-1), a group represented by the following formula (7-2) or a group represented by the following formula (7-3):

$$R^{f11}O\{(CF_2O)_{m21}(CF_2CF_2O)_{m22}\}CF_2— \quad (7\text{-}1)$$

$$R^{f11}OCHFCF_2OCH_2CF_2O\{(CF_2O)_{m21}(CF_2CF_2O)_{m22}\}CF_2— \quad (7\text{-}2)$$

$$R^{f11}O(CF_2CF_2OCF_2CF_2CF_2CF_2O)_{m25}CF_2CF_2OCF_2CF_2— \quad (7\text{-}3)$$

wherein $R^{f11}$ is a $C_{1-20}$ perfluoroalkyl group, each of m21 and m22 is an integer of at least 1, and m21+m22 is an integer of from 2 to 200, provided that each $CF_2O$ and each $CF_2CF_2O$ may be bonded in any order, and m25 is an integer of from 1 to 99.

7. The process for producing a fluorinated ether compound according to claim 3, wherein m1 is 0.

8. The process for producing a fluorinated ether compound according to claim 1, wherein the compound represented by the formula (5) is diallylamine.

9. The process for producing a fluorinated ether compound according to claim 1, wherein the compound represented by the formula (3) is reacted with the compound represented by the formula (5) in a liquid medium.

10. A process for producing a fluorinated ether compound, which comprises obtaining a compound represented by the formula (2) by the process for producing a fluorinated ether compound as defined in claim 1, and reacting the compound represented by the formula (2) with a compound represented by the following formula (6) to obtain a compound represented by the following formula (1):

$$HSiR^2_nL_{3-n} \quad (6)$$

$$R^f(CF_2)_a—C(=O)N(—R^1CH_2CH_2SiR^2_nL_{3-n})_2 \quad (1)$$

wherein $R^2$ is a monovalent hydrocarbon group,

L is a hydrolysable group, and n is an integer of from 0 to 2.

11. The process for producing a fluorinated ether compound according to claim 10, wherein $R^2$ is an alkyl group having at most 4 carbon atoms.

12. The process for producing a fluorinated ether compound according to claim 10, wherein L is an alkoxy group having at most 4 carbon atoms or a chlorine atom.

13. The process for producing a fluorinated ether compound according to claim 1, wherein the reacting is carried out in a fluorinated organic solvent.

* * * * *